(12) United States Patent
Kuwabara et al.

(10) Patent No.: US 10,549,618 B2
(45) Date of Patent: Feb. 4, 2020

(54) WEATHER STRIP

(71) Applicants: NISHIKAWA RUBBER CO., LTD., Hiroshima-shi, Hiroshima (JP); Honda Motor Co., Ltd., Wako-shi, Saitama (JP)

(72) Inventors: Hirokazu Kuwabara, Hiroshima (JP); Yoshitaka Nishimoto, Hiroshima (JP); Futoshi Kobayashi, Wako (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 15/634,162

(22) Filed: Jun. 27, 2017

(65) Prior Publication Data
US 2017/0368923 A1    Dec. 28, 2017

(30) Foreign Application Priority Data
Jun. 28, 2016 (JP) .................................. 2016-127970

(51) Int. Cl.
*B60J 10/84* (2016.01)
*B60J 10/77* (2016.01)

(52) U.S. Cl.
CPC .............. *B60J 10/84* (2016.02); *B60J 10/77* (2016.02)

(58) Field of Classification Search
CPC ................................ B60J 10/84; B60J 10/77
USPC ......................................................... 49/428
See application file for complete search history.

(56) References Cited

U.S. PATENT DOCUMENTS

| 5,209,019 A * | 5/1993 | Morita ................... | B60J 10/248 49/475.1 |
| 5,331,767 A * | 7/1994 | Takeuchi ............... | B60J 10/777 49/475.1 |
| 6,099,068 A * | 8/2000 | Kim ....................... | B60J 10/248 296/146.9 |
| 7,487,615 B2 * | 2/2009 | Watanabe ............... | B60J 10/74 49/428 |
| 8,567,127 B2 * | 10/2013 | Takase ..................... | B60J 10/74 49/428 |
| 8,689,489 B2 * | 4/2014 | Mine ........................ | B60J 10/76 49/441 |

(Continued)

FOREIGN PATENT DOCUMENTS

| EP | 1862343 | 12/2007 |
| JP | 59-106320 A | 6/1984 |

(Continued)

OTHER PUBLICATIONS

JP Office Action for JP Patent Application No. 2016-127970, dated Apr. 10, 2018.

(Continued)

*Primary Examiner* — Gregory J Strimbu
(74) *Attorney, Agent, or Firm* — Casimir Jones, SC; Robert Goetz

(57) ABSTRACT

A weather strip that is designed to prevent appearance degradation, designed to prevent a decrease in sealing properties, and designed to prevent a decrease in sound insulating properties at a peripheral section of a sashless door opening. In particular, the weather strip (1) includes a base, a seal lip section (first seal lip section (12)) and a protruding section (13) supporting the seal lip section (first seal lip section (12)) in a state where a door opening is closed.

5 Claims, 5 Drawing Sheets

(56) References Cited

U.S. PATENT DOCUMENTS

| | | | |
|---|---|---|---|
| 9,038,319 B2* | 5/2015 | Kuwabara | B60J 10/048 49/498.1 |
| 2005/0200157 A1* | 9/2005 | Morihara | B60J 10/24 296/107.04 |
| 2014/0075848 A1 | 3/2014 | Masumoto | |

FOREIGN PATENT DOCUMENTS

| | | |
|---|---|---|
| JP | 59-114125 A | 7/1984 |
| JP | 04-079721 U | 7/1992 |
| JP | 04-262922 A | 9/1992 |
| JP | 06-053244 U | 7/1994 |
| JP | 7-323733 | 12/1995 |
| JP | 08-310242 A | 11/1996 |
| JP | 09-295514 A | 11/1997 |
| JP | 2005-255007 | 9/2005 |
| JP | 2007-308044 | 11/2007 |
| JP | 2008-162330 | 7/2008 |
| JP | 2011-178199 | 9/2011 |
| JP | 2012-153278 | 8/2012 |
| JP | 2014-058277 | 4/2014 |
| JP | 2015-042501 | 3/2015 |
| WO | 2015/033782 | 3/2015 |

OTHER PUBLICATIONS

Office Action, CN Patent Application No. 201710502100.8, dated Jul. 24, 2019.

\* cited by examiner

WEATHER STRIP

This Nonprovisional application claims priority under 35 U.S.C. § 119 on Patent Application No. 2016-127970 filed in Japan on Jun. 28, 2016, the entire contents of which are hereby incorporated by reference.

TECHNICAL FIELD

The present invention relates to a weather strip which is attached to a peripheral section of a door opening of a sashless door-type automobile.

BACKGROUND ART

Conventionally, for sashless door-type automobiles such as a hard top, research and development of weather strips with various structures has been conducted in order to improve sealing properties, sound insulating properties, and the like at a peripheral section of an opening in a body of such an automobile.

For example, Japanese Patent Application Publication Tokukaisho No. 59-106320 (Publication date: Jun. 20, 1984) discloses a door weather strip which includes a base section and a hollow lip. The door weather strip is arranged such that (i) a stay is provided inside a hollow section of the hollow lip and (ii) a lip is provided in a midway section of the stay, which lip has been integrally molded with the stay so as to protrude toward an exterior of the automobile. After a peripheral section of door glass starts to come into close contact with a lip supporting wall, on an automobile exterior side, of the hollow lip, a tip of the lip presses the lip supporting wall from inside the hollow section, so that the peripheral section of the door glass and the lip supporting wall are brought into contact with each other with increased force. This improves sealing properties and sound insulating properties.

Further, Japanese Utility Model Registration Application Publication Jitsukaihei No. 4-79721 (Publication date: Jul. 10, 1992) discloses a weather strip for a rear door which weather strip includes a rear pillar section and a roof section. The weather strip for a rear door is arranged such that (i) a lip-like sealing section is provided at a tip of a portion of a base of each of the rear pillar section and the roof section which portion is on an interior side and (ii) a lip-like portion protruding toward each base is provided on a surface of the lip-like sealing section which surface is on the interior side. Further, in a state where an upper end of door glass is in elastic contact with a hollow sealing section which has been integrally molded with the base, the door glass presses the lip-like sealing section toward the interior side, and in accordance with the pressing, a tip of the lip-like portion of the lip-like sealing section comes into elastic contact with the base, so that reactive force from the base is exerted to the tip. This brings the door glass and the lip-like sealing section into close contact with each other with increased force. Accordingly, sealing properties and sound insulating properties are improved.

SUMMARY OF INVENTION

Technical Problem

However, according to the door weather strip disclosed in Japanese Patent Application Publication Tokukaisho No. 59-106320 (Publication date: Jun. 20, 1984), the lip is provided only in a portion of the hollow lip which portion is disposed at a roof, and no lip is provided in a portion of the hollow lip which portion is disposed at a rear. In a case where the door is closed, the door glass first abuts against a portion of the door weather strip which portion is disposed at the rear. Accordingly, in a case where the door weather strip becomes deteriorated with age so as to have decreased elasticity, the lack of a lip at the portion disposed at the rear results in intrusion of the door glass toward an inner side of the automobile in a state where the door is closed. This degrades appearance and prevents the door from being properly closed.

Further, the weather strip for a rear door disclosed in Japanese Utility Model Registration Application Publication Jitsukaihei No. 4-79721 (Publication date: Jul. 10, 1992) has the following problem. In a state where the upper end of the door glass is in elastic contact with the hollow sealing section, the reactive force exerted to the tip of the lip-like portion is not directly exerted to the lip-like sealing section. As such, force with which the lip-like sealing section presses the door glass in cooperation with the reactive force is not very significant, so that it may not be possible to sufficiently prevent the intrusion of the door glass toward the inner side of the automobile, which intrusion is caused by deterioration with age of the weather strip for a rear door. Furthermore, the door weather strip and the weather strip for a rear door described above both have a problem that as each weather strip deteriorates with age, the weather strip becomes unable to hold the door glass at a designed position, so that sealing properties and sound insulating properties at a peripheral section of an opening in a body of the automobile may be decreased.

The present invention is accomplished in view of the foregoing problems. An object of the present invention is to provide a weather strip which enables prevention of degradation in appearance and decrease in sealing properties and sound insulating properties at a peripheral section of an opening in a body of an automobile, which degradation and decrease are caused by deterioration of the weather strip with age.

Solution to Problem

In order to attain the object, a weather strip in accordance with an aspect of the present invention is a weather strip which is attached to a peripheral section of a sashless door opening of an automobile, including: a base secured along the peripheral section; and a seal lip section for sealing between the peripheral section and door glass in a door opening-closed state in which the sashless door opening has been closed by a sashless door, the base being provided with a protruding section protruding toward a vehicle exterior side in a state where the base is secured to the peripheral section,
the protruding section supporting the seal lip section by abutting against the seal lip section in the door opening-closed state.

Advantageous Effects of Invention

A weather strip in accordance with an aspect of the present invention enables prevention of degradation in appearance and decrease in sealing properties and sound insulating properties at a peripheral section of an opening in a body of an automobile, which degradation and decrease are caused by deterioration of the weather strip with age.

BRIEF DESCRIPTION OF DRAWINGS

FIG. 1b is a perspective view schematically illustrating an arrangement around a door opening, on a front side, of the automobile illustrated in FIG. 1a.

DESCRIPTION OF EMBODIMENTS

<Example of Attachment of Weather Strip>

The following description will first discuss, with reference to FIG. 1, a structure around a door opening of an automobile to which a weather strip in accordance with the present invention is attached.

Figure 1A:
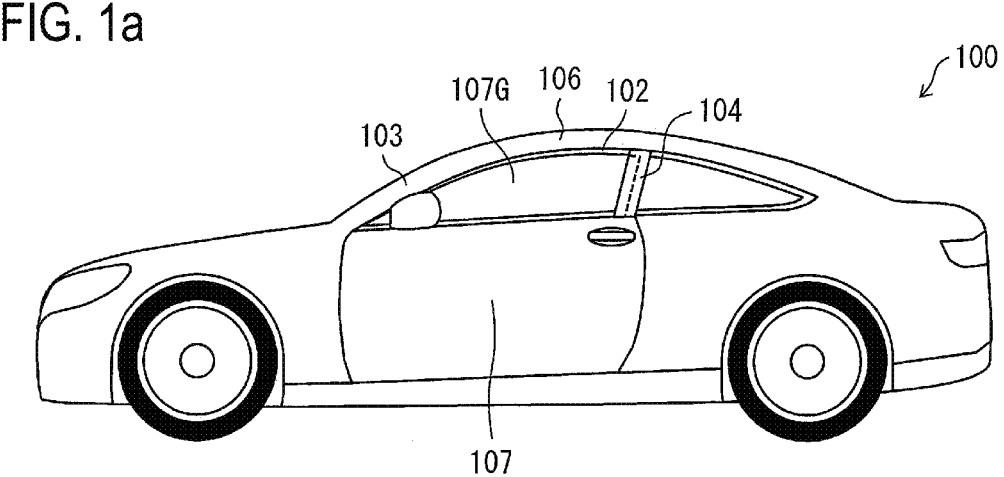
FIG. 1a is a side view illustrating appearance of an automobile to which a weather strip in accordance with an embodiment of the present invention is attached.
Figure 1B:
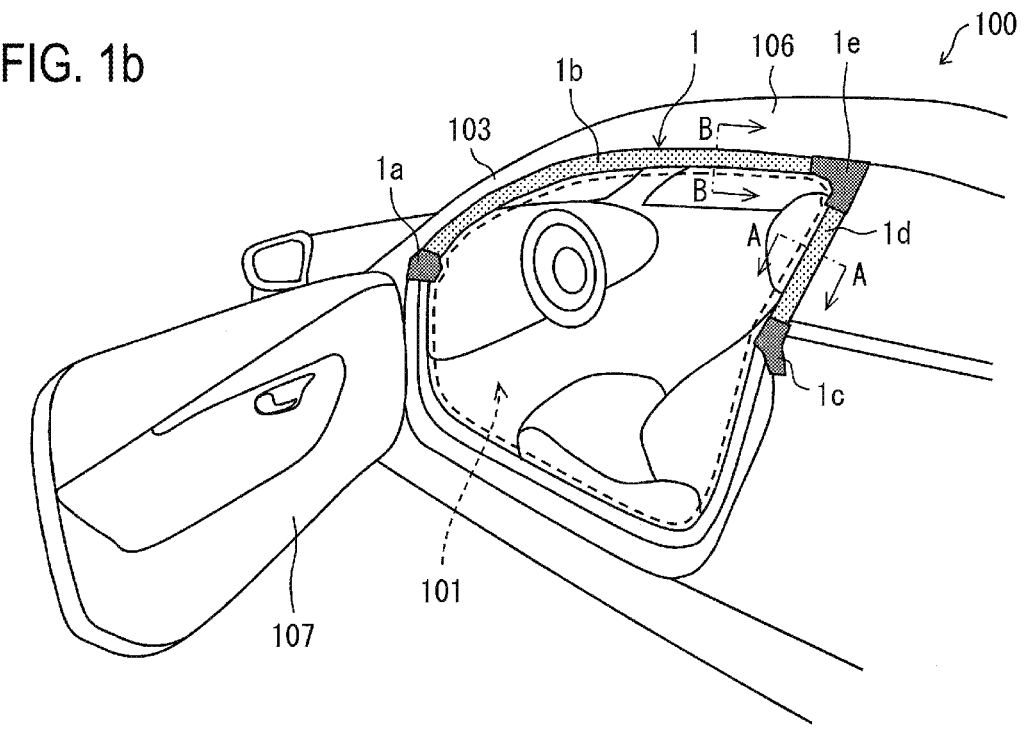

As illustrated in FIG. 1a and FIG. 1b, a weather strip 1 for sealing between a peripheral section 102 of a door opening (sashless door opening) 101 on a front side of a hardtop (automobile) 100 and front door glass (door glass) 107G is attached to the peripheral section 102. Specifically, the weather strip 1 is attached to a region which extends, on a side of a body of the automobile, from a lower end of a front pillar (pillar) 103 through a roof side 106 to a lower end of a center pillar (pillar) 104.

More specifically, the peripheral section 102 refers to a peripheral section 102 of the door opening 101 on the front side, against which peripheral section 102 an outer peripheral edge of the front door glass 107G directly abuts above a belt line BL (a portion in the vicinity of a boundary between a door panel and the door glass of the sashless door) when the door is closed.

Note that the term "when the door is closed" refers to a door opening-closed state in which the door opening 101 has been closed by the front door (sashless door) 107. Hereinafter, the door opening-closed state is simply referred to as "when the door is closed."

As illustrated in FIG. 1a, a first mold-molded section 1a and a first extrusion molded section 1b of the weather strip 1 integrally constitute a portion where the front pillar 103 and the roof side 106 are sealed. A second mold-molded section 1c and a second extrusion molded section 1d of the weather strip 1 integrally constitute a portion where the center pillar 104 is sealed. Further, the first extrusion molded section 1b and the second extrusion molded section 1d are connected to each other by being integral with a third mold-molded section 1e which is substantially L shaped and provided in a region in the vicinity of a portion of the peripheral section 102 in which portion the center pillar 104 and the roof side 106 are connected to each other.

The portion of the weather strip 1 in which portion the front pillar 103 and the roof side 106 are sealed is formed in the following manner. First, the first extrusion molded section 1b is molded by extrusion molding with use of a general extruder or the like. Next, an end of the first extrusion molded section 1b is set in a metallic mold, and the first mold-molded section 1a is molded by metallic molding with use of an injection molder or a transfer molder. Thus, the first mold-molded section 1a and the first extrusion molded section 1b of the weather strip 1 are integrally molded. Also in the portion of the weather strip 1 in which portion the center pillar 104 is sealed, the second mold-molded section 1c and the second extrusion molded section 1d of the weather strip 1 are integrally molded by a similar method to the above-described method.

Lastly, an end of the first extrusion molded section 1b at which end the first mold-molded section 1a is not provided and an end of the second extrusion molded section 1d at which end the second mold-molded section 1c is not provided are set in a metallic mold, and the third mold-molded section 1e is molded by metallic molding with use of an injection molder or the like. Thus, the first extrusion molded section 1b and the second extrusion molded section 1d are integrated with the third mold-molded section 1e, so that the weather strip 1 is provided.

Each portion constituting the weather strip 1 is made of a sponge-like rubber. A material for the rubber can be, for example, EPDM (ethylene-propylene-diene rubber). Note that other rubber materials or other elastic materials having a rubber-like elasticity, such as IR (isoprene rubber), CR (chloroprene rubber), a thermoplastic elastomer (olefin or styrene thermoplastic elastomer), soft polyvinyl chloride, and the like can be used as a molding material. Further, a part or whole of the weather strip 1 can be made of a solid material.

Note that the weather strip in accordance with the present invention is applicable to a convertible whose roof can be open, instead of the hardtop 100 described in the present embodiment. In other words, an automobile to which the weather strip in accordance with the present invention is to be attached may be any type of automobile, provided that it is a sashless door-type automobile.

<Structure of Weather Strip>

With reference to FIGS. 2a, 2b, 3a and 3b, the following description will next discuss a structure of the weather strip 1. Note that (a) and (b) of FIG. 2 each illustrate cross sections of the second extrusion molded section 1d of the weather strip 1, the front door glass 107G, a holder 108a, a link 109, and a cover panel 110. In each of (a) and (b) of FIG. 2, an upper side and a lower side of a drawing sheet of FIG. 5 correspond to an outer side (a vehicle exterior side) of the automobile and an inner side (a vehicle interior side) of the automobile, respectively.

Figure 2A:
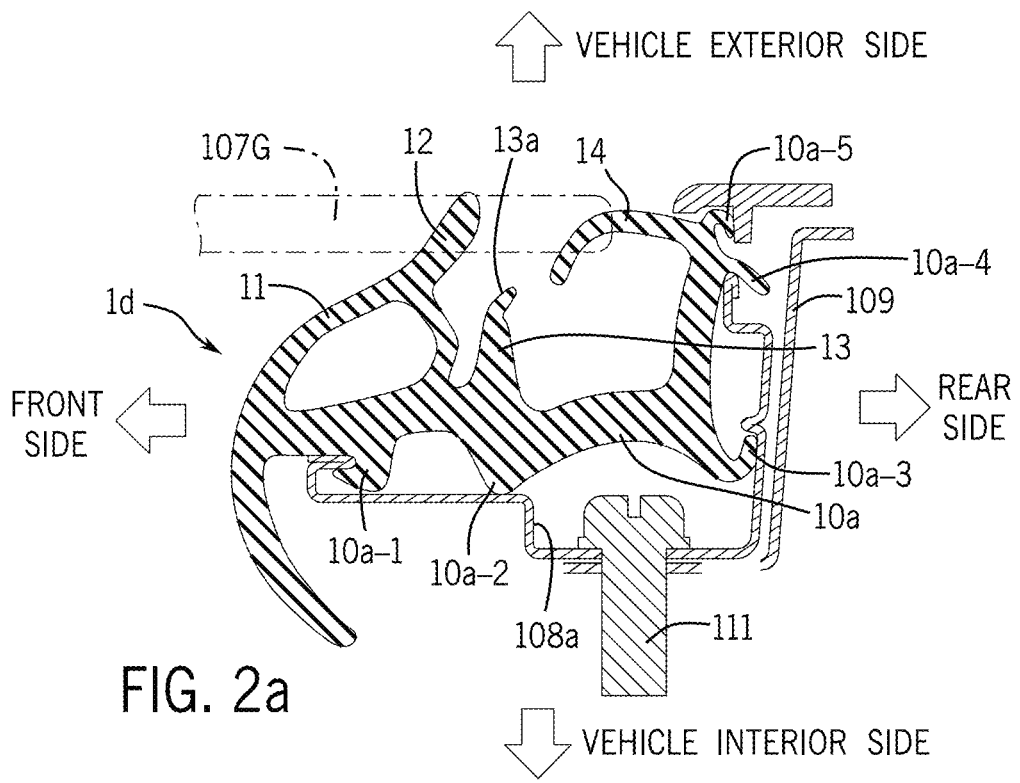
FIG. 2a is a cross-sectional view of the weather strip illustrated in FIG. 1b, the view being taken along a line A-A in FIG. 1b.
Figure 2B:
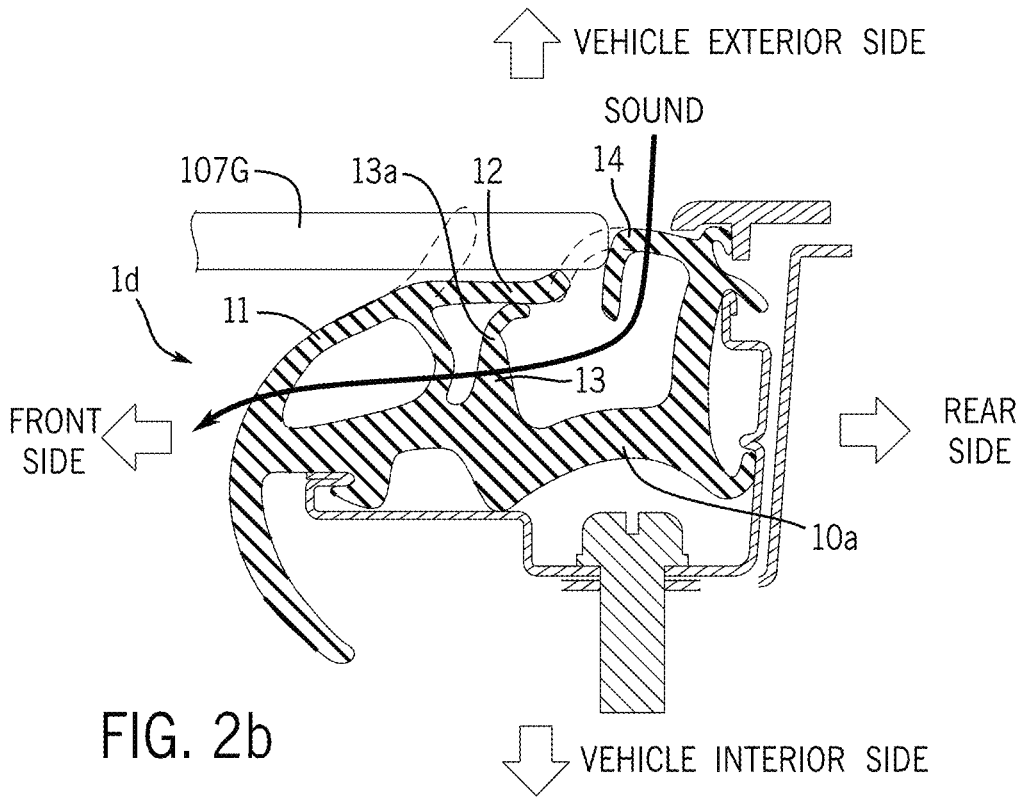
FIG. 2b is a cross-sectional view schematically illustrating an arrangement around a pillar portion at a time when a door is closed.
Figure 3A:
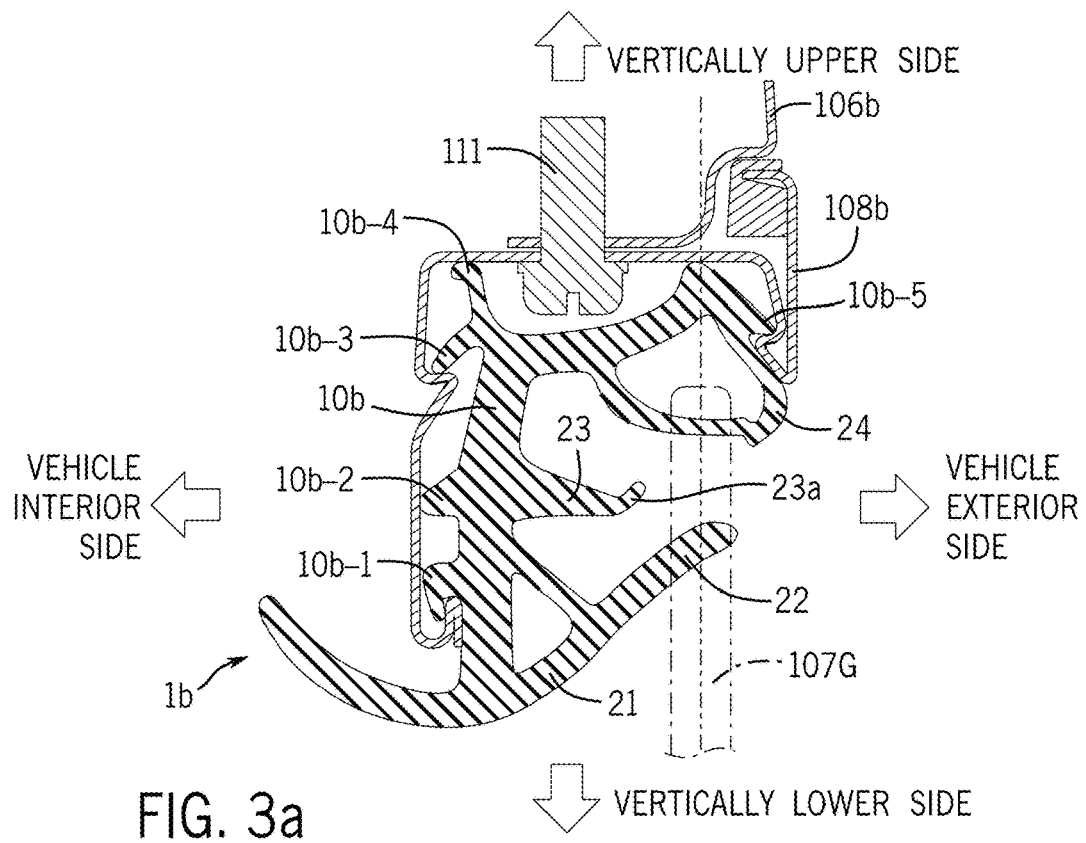
FIG. 3a is a cross-sectional view of the weather strip illustrated in FIG. 1b, the view taken along a line B-B in FIG. 1b.
Figure 3B:
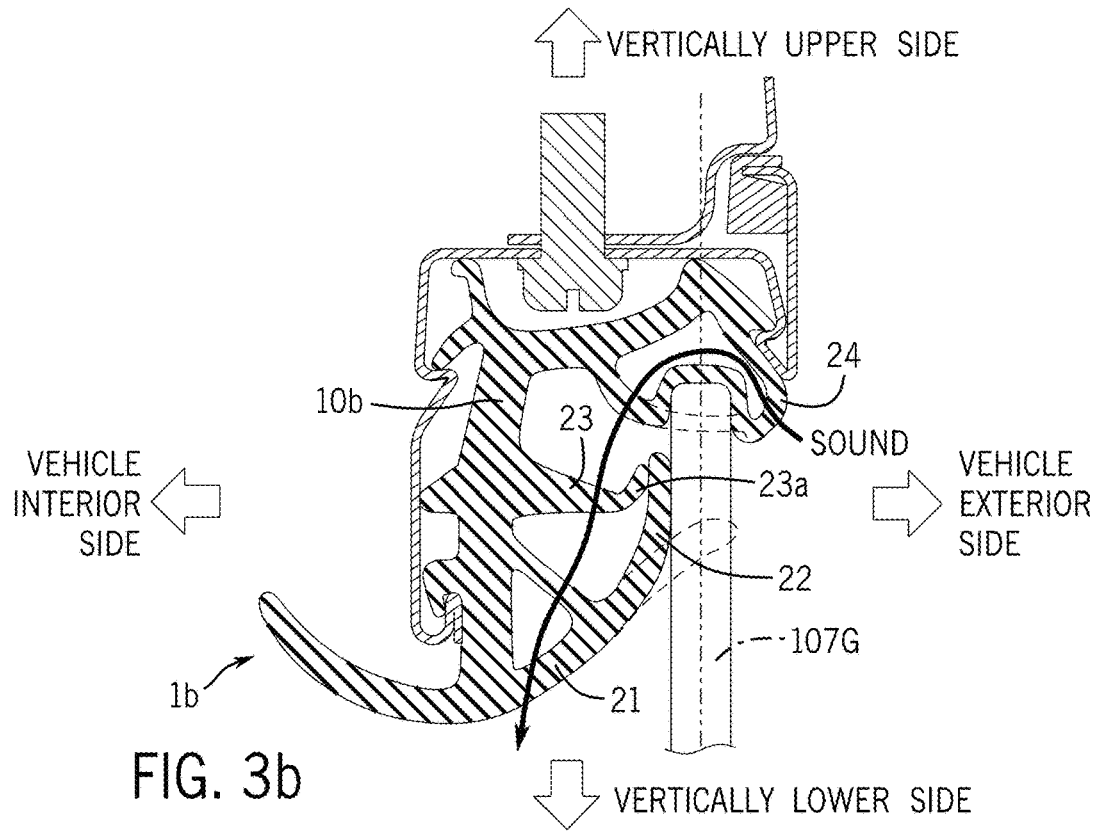
FIG. 3b is a cross-sectional view schematically illustrating an arrangement around a roof portion at a time when the door is closed.

FIG. 3a and FIG. 3b illustrate cross sections of (i) a portion of the first extrusion molded section 1b of the weather strip 1 at which portion the roof side 106 is sealed, (ii) the roof side 106, (iii) the front door glass 107G, and (iv) a holder 108b. In each of FIG. 2a and FIG. 2b, a right-hand side and a left-hand side of a drawing sheet of FIG. 3 correspond to the vehicle exterior side and the vehicle interior side, respectively.

As shown in FIG. 2a and FIG. 2b, the second extrusion molded section 1d is constituted by a pillar portion 10a, a pillar-side hollow lip section 11, a first seal lip section (seal lip section) 12, a pillar-side protruding section (protruding section) 13, and a second seal lip section 14.

Though not illustrated in the drawings, a portion of the first extrusion molded section 1b of the weather strip 1 at which portion the front pillar 103 is sealed is constituted by a roof portion 10b, a roof-side hollow lip section 21, a roof-side seal lip section 22, a roof-side protruding section 23, and a hollow sealing section 24, each of which will be described later.

The pillar portion 10a is a portion which is secured along a region of the peripheral section 102 of the door opening 101 on the front side which region corresponds to the center pillar 104 (i.e., the pillar portion 10a is a portion which is provided at the pillar). Further, (i) the pillar portion 10a of the second extrusion molded section 1d and (ii) the roof portion 10b, which is provided at the portion of the first extrusion molded section 1b at which portion the front pillar 103 is sealed, constitute a base which is secured along the entire peripheral section 102.

The pillar portion 10a is secured to the holder 108a, which has a substantially L-shaped cross section and is fixed by a screw 111 to the link 109 attached to the center pillar 104. Specifically, a tip of the holder 108a on the front side is bent so as to have a U-shaped cross section, and a first engaging section 10a-1 of the pillar portion 10a engages with this U-shaped portion. Further, a tip of a protrusion 10a-2 of the pillar portion 10a abuts against a surface of the holder 108a which surface faces the front door glass 107G.

The holder 108a has, on a surface thereof extending in a direction from the vehicle interior side to the vehicle exterior side, a locked section having a protruding cross section and extending along a longitudinal direction of the holder 108a. The locked section is locked by a tip of a V shape cross sectioned first locking section 10a-3 of the pillar portion 10a. A tip of the holder 108a on the rear side is engaged by a second engaging section 10a-4 of the pillar portion 10a. A tip of a second locking section 10a-5 of the pillar portion 10a locks on a locked section which has a protruding cross section and is provided on a surface of the cover panel 110 on the vehicle interior side so as to extend along a longitudinal direction of the cover panel 110.

The pillar-side hollow lip section 11 is a portion which has a hollow section and is provided at an end of the pillar portion 10a on the front side so as to extend along a longitudinal direction of the pillar portion 10a. Due to having a thin circumferential wall which constitutes the hollow section, the pillar-side hollow lip section 11 bends flexibly when the door is closed. As such, the pillar-side hollow lip section 11 serves as a cushion for absorbing a shock in the vicinity of the peripheral section 102 which is generated in a moment of closing the front door glass 107G or generated due to rattling of the front door glass 107G during driving of the automobile, and furthermore, the circumferential wall of the pillar-side hollow lip section 11 also serves as a sound insulation wall.

A distance between a section of the pillar-side hollow lip section 11 and a point of a base in a direction from a vehicle interior side of the automobile to the vehicle exterior side of the automobile being shorter than a distance between a tip 13a of the protruding section 13, which protrudes towards the vehicle exterior side, and the point of the base in the direction from the vehicle interior side to the vehicle exterior side.

As illustrated in FIG. 2a, the first seal lip section 12 is a fin-shaped portion which extends from the vicinity of a top of the pillar-side hollow lip section 11 toward the vehicle exterior side in a state where the pillar portion 10a is secured to the holder 108a. Further, the first seal lip section 12 is provided along the longitudinal direction of the pillar portion 10a. As illustrated in FIG. 2b, when the door is closed, the first seal lip section 12 seals between (i) the region of the peripheral section 102 which region corresponds to the center pillar 104 and (ii) the front door glass 107G by abutting against a surface of the front door glass 107G which surface is on the vehicle interior side.

As illustrated in FIG. 2a, the pillar-side protruding section 13 is a fin-shaped portion which is provided along the longitudinal direction of the pillar portion 10a so as to protrude from the pillar portion 10a toward the vehicle exterior side in a state where the pillar portion 10a is secured to the holder 108a (i.e., the peripheral section 102). Further, the pillar-side protruding section 13 has a thickness which gradually increases from the vicinity of a tip of the pillar-side protruding section 13 toward the vicinity of a root of the pillar-side protruding section 13 so that the pillar-side protruding section 13 itself does not bend when the door is closed. Further, the pillar-side protruding section 13 is provided, at the tip thereof, with a pillar-side tip lip section (tip lip section) 13a which likewise has a shape of fin. As illustrated in FIG. 2b, when the door is closed, the pillar-side tip lip section 13a elastically abuts against the first seal lip section 12 while bending, so that the pillar-side tip lip section 13a and the pillar-side protruding section 13 together support the first seal lip section 12. At this time, a back surface of the pillar-side protruding section 13 abuts against a main body of the body of the hardtop 100. This allows force applied from the front door glass 107G to the pillar-side protruding section 13 to be directly transmitted to the body of the hardtop 100.

As illustrated in FIG. 2a, the direction in which the first seal lip section 12 extends is substantially identical to a direction (slightly tilted from a vertically upper direction to the rear side) in which the pillar-side tip lip section 13a extends. As such, when the door is closed, a tip of the first seal lip section 12 and a tip of the pillar-side tip lip section 13a both face in a direction in which the front door glass 107G advances, as illustrated in FIG. 2b. In a case where the direction in which the pillar-side tip lip section 13a extends is thus designed so that, when the door is closed, the tip of the pillar-side tip lip section 13a faces in the direction in which the front door glass 107G advances, it is possible, for example, to prevent rain or the like, which has intruded toward the vehicle interior side through a gap between the front door glass 107G and the second seal lip section 14 (described later), from being guided by the pillar-side tip lip section 13a to the front side. Note that it is not essential that the direction in which the first seal lip section 12 extends is substantially identical to the direction in which the pillar-side tip lip section 13a extends.

As illustrated in FIG. 2a, the second seal lip section 14 is a fin-shaped portion which is provided at an end of the pillar portion 10a on the rear side. An end of the second seal lip section 14 is curved so that a tip of the second seal lip section 14 faces the pillar-side protruding section 13. Further, the second seal lip section 14 is provided along the longitudinal direction of the pillar portion 10a. As illustrated in FIG. 2b, when the door is closed, the second seal lip section 14 seals between (i) the region of the peripheral section 102 which region corresponds to the center pillar 104 and (ii) the front door glass 107G by abutting against a side surface of the front door glass 107G which surface is on the rear side.

Further, as illustrated in FIG. 3b, each of (i) the second extrusion molded section 1d and (ii) a portion of the first extrusion molded section 1b at which portion the front pillar 103 is sealed insulates sound from outside by means of circumferential walls of the hollow sealing section 24, the roof-side protruding section 23, and the roof-side hollow lip section 21 (see an arrow in FIG. 3b). Meanwhile, a conventional weather strip 50 has no pillar-side protruding section 13 at a portion where a pillar is sealed, and sound from outside is insulated by a circumferential wall of a pillar-side hollow sealing section 51 and a circumferential wall of a pillar-side hollow lip section 52 (see FIG. 4a). The weather strip in accordance with the embodiment of the present invention 1 thus has one extra wall for sound insulation as compared with the conventional weather strip 50. This allows the weather strip in accordance with the embodiment of the present invention 1 to achieve an improvement in sound insulating properties at portions where the front pillar 103 and the center pillar 104 are sealed.

Note that the pillar-side hollow lip section 11, the first seal lip section 12, the pillar-side tip lip section 13a, and the second seal lip section 14 are each preferably made of a material which is capable of bending flexibly, in view of functions of the respective lip sections. Accordingly, a molding material for each of these lip sections is preferably, for example, an EPDM sponge having a specific gravity equivalent to 0.5 to 0.65. Further, the pillar-side protruding section 13 is preferably made of a solid elastic material (elastic member) in order to suppress a decrease in force to support the first seal lip section 12 which decrease is caused by deterioration with age. Accordingly, a molding material for the pillar-side protruding section 13 is preferably, for example, an EPDM solid having a hardness equivalent to a Hs of 50 to 70.

Next, as illustrated in FIG. 3a and FIG. 3b, the portion of the first extrusion molded section 1b at which portion the roof side 106 is sealed is constituted by the roof portion 10b, the roof-side hollow lip section 21, the roof-side seal lip section (seal lip section) 22, the roof-side protruding section (protruding section) 23, and the hollow sealing section 24.

The roof portion 10b is a portion which is secured along a region of the peripheral section 102 of the door opening 101 on the front side which region corresponds to the roof side 106 (i.e., the roof portion 10b is a portion which is provided at the roof side). The roof portion 10b is secured to the holder 108b, which has a substantially L-shaped cross section and is fixed by a screw 111 to a main body side wall 106b of the roof side 106.

Specifically, a tip of the holder 108b on the vehicle interior side is bent so as to have a U-shaped cross section, and a first engaging section 10b-1 of the roof portion 10b engages with this U-shaped portion. A tip of a protrusion 10b-2 of the roof portion 10b abuts against a surface of the holder 108b which surface faces the front door glass 107G. Further, the holder 108b has, on the surface thereof facing the front door glass 107G, a V shape cross sectioned locked section which (i) extends along a longitudinal direction of the holder 108b and (ii) is locked by a tip of a locking section 10b-3 of the roof portion 10b.

A surface of the holder 108b which surface extends in a direction from the vehicle interior side to the vehicle exterior side is abutted against by a tip of a fin-shaped abutting section 10b-4 of the roof portion 10b. Further, the holder 108b has, at a tip thereof on the vehicle exterior side, an engaged section which extends along the longitudinal direction of the holder 108b and with which a second engaging section 10b-5 of the roof portion 10b engages.

The roof-side hollow lip section 21 is a portion which has a hollow section and is provided at an end of the roof portion 10b on a vertically lower side. The roof-side hollow lip section 21 has a thin circumferential wall which constitutes the hollow section. The roof-side hollow lip section 21 extends along a longitudinal direction of the roof portion 10b.

As illustrated in FIG. 3a, the roof-side seal lip section 22 is a fin-shaped portion which extends from the vicinity of a top of the roof-side hollow lip section 21 toward the vehicle exterior side in a state where the roof portion 10b is secured to the holder 108b.

As illustrated in FIG. 3a, the roof-side protruding section 23 is a fin-shaped portion which protrudes from the roof portion 10b toward the vehicle exterior side in a state where the roof portion 10b is secured to the holder 108b (i.e., the peripheral section 102). The roof-side protruding section extends along the longitudinal direction of the roof portion 10b. As with the pillar-side protruding section 13, the roof-side protruding section 23 has a thickness which gradually increases from the vicinity of a tip of the roof-side protruding section 23 toward the vicinity of a root of the roof-side protruding section 23. Further, the roof-side protruding section 23 is provided, at the tip thereof, with a tip lip section (tip lip section) 23a which likewise has a shape of fin. The direction in which the roof-side seal lip section 22 extends is substantially identical to a direction in which the roof-side tip lip section 23a extends.

Note that the roof-side hollow lip section 21, the roof-side seal lip section 22, the roof-side protruding section 23, and the roof-side tip lip section 23a have functions and roles which are similar to those of the pillar-side hollow lip section 11, the first seal lip section 12, the pillar-side protruding section 13, and the pillar-side tip lip section 13a.

As illustrated in FIG. 3a, the hollow sealing section 24 is a portion which has a hollow section and is provided at an end of the roof portion 10b on a vertically upper side so as to extend along the longitudinal direction of the roof portion 10b. As with the roof-side hollow lip section 21, the hollow sealing section 24 has a thin circumferential wall which constitutes the hollow section. As illustrated in FIG. 3b, when the door is closed, an end surface of the front door glass 107G abuts against a portion of the circumferential wall of the hollow sealing section 24 which portion is on the vertically lower side, and an end of the front door glass 107G pushes the portion up. Being in this state allows the hollow sealing section 24 to seal between (i) the region of the peripheral section 102 which region corresponds to the roof side 106 and (ii) the front door glass 107G.

Molding materials for the roof-side hollow lip section 21, the roof-side seal lip section 22, the roof-side protruding section 23, the roof-side tip lip section 23a, and the hollow sealing section 24 are similar to the above-described molding materials for the pillar-side hollow lip section 11 and the like.

Further, as illustrated in FIG. 3b, a portion of the first extrusion molded section 1b at which portion the roof side 106 is sealed insulates sound from outside by means of circumferential walls of the hollow sealing section 24, the roof-side protruding section 23, and the roof-side hollow lip section 21 (see an arrow in FIG. 3b). Meanwhile, a conventional weather strip 50 has no roof-side protruding section 23 at a portion where a roof side is sealed, and sound from outside is insulated by a circumferential wall of a roof-side hollow sealing section 61 and a circumferential wall of a roof-side hollow lip section 62 (see FIG. 4b). The weather strip in accordance with the embodiment of the present invention 1 thus has one extra wall for sound insulation as compared with the conventional weather strip 50. This allows the weather strip in accordance with the embodiment of the present invention 1 to achieve an improvement in sound insulating properties also at a portion where the roof side is sealed.

<Appearance in Vicinity of Peripheral Section at Time when Door is Closed>

The following description will next discuss, with reference to FIG. 4, appearance of the vicinity of the peripheral section 102 at a time when the door is closed, in comparison with the conventional weather strip 50.

Figure 4A:
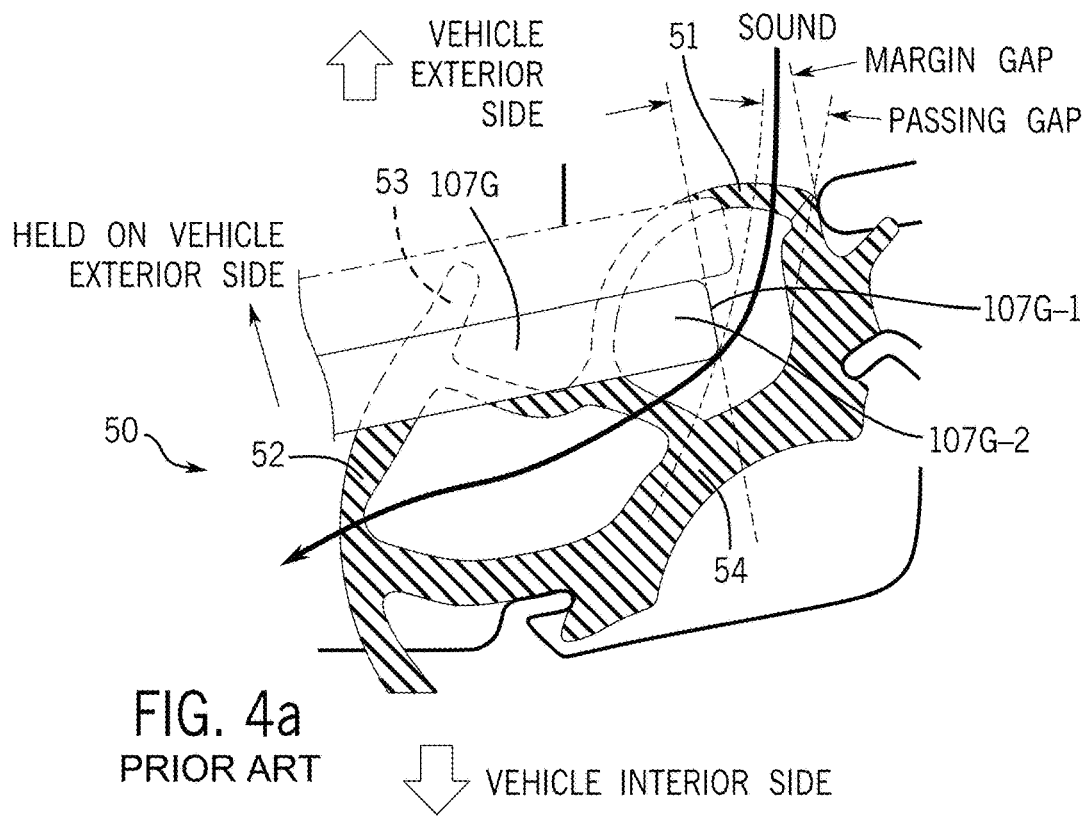
FIG. 4a and FIG. 4b are cross-sectional views each illustrating a state in which door glass has intruded toward an inner side of the automobile from a designed position, in a case where a conventional weather strip is used.

As illustrated in FIG. 4a portions of the conventional weather strip 50 at which portions the front pillar and the center pillar are sealed are not provided with any portion similar to the pillar-side protruding section 13 which portion supports the pillar-side seal lip section 53 when the door is closed. As such, attaching the conventional weather strip 50 to the hardtop 100 results in a phenomenon in which the front door glass 107G intrudes toward the vehicle interior side due to deterioration of the conventional weather strip 50 with age (see a portion indicated with a solid line in FIG. 4a. Accordingly, when a passing gap is taken into account, a large margin gap is formed when the door is closed. This compromises appearance of a region of the peripheral section 102 which region corresponds to the center pillar 104.

Note that the "passing gap" refers to a gap, formed when opening and closing operations of the front door 107 are carried out, between (i) an end point on a pillar-side end surface 107G-1 of the front door glass 107G which end point is on the vehicle interior side and (ii) a surface of a base 54 which surface constitutes a hollow section of the pillar-side hollow sealing section 51 (see a width indicated by dash-dot-dot lines in FIG. 4). The "passing gap" is provided in order to prevent a pillar-side end 107G-2 of the front door glass 107G from being caught by the base 54 when opening and closing operations of the front door 107 are carried out. The "margin gap" refers to a gap, formed when the door is closed, between the pillar-side end surface 107G-1 of the front door glass 107G and a bottom surface of the base 54 which bottom surface is on the pillar side (see a width indicated by broken lines in FIG. 4).

Meanwhile, the pillar portion 10a of the weather strip 1 in accordance with the embodiment of the present invention is provided with the pillar-side protruding section 13 (and the pillar-side tip lip section 13a). As such, even if the weather strip 1 becomes deteriorated with age, the front door glass 107G does not intrude toward the vehicle interior side very much. Accordingly, in a case where the weather strip 1 in accordance with the embodiment of the present invention is used for a period of time equal to that of the conventional weather strip 50, a position of the front door glass 107G at the time when the door is closed is maintained at a position closer to the vehicle exterior side as compared with a case in which the conventional weather strip 50 is used, as illustrated in FIG. 4a (see a portion indicated with a dash-dot line in FIG. 4).

Accordingly, even in a case where the margin gap is reduced as compared with a case where the conventional weather strip 50 is attached, it is still possible to provide a sufficient passing gap. Thus, the margin gap can be designed small. This enables prevention of degradation in appearance in the vicinity of the peripheral section 102 which degradation is caused by deterioration with age.

Figure 4B:
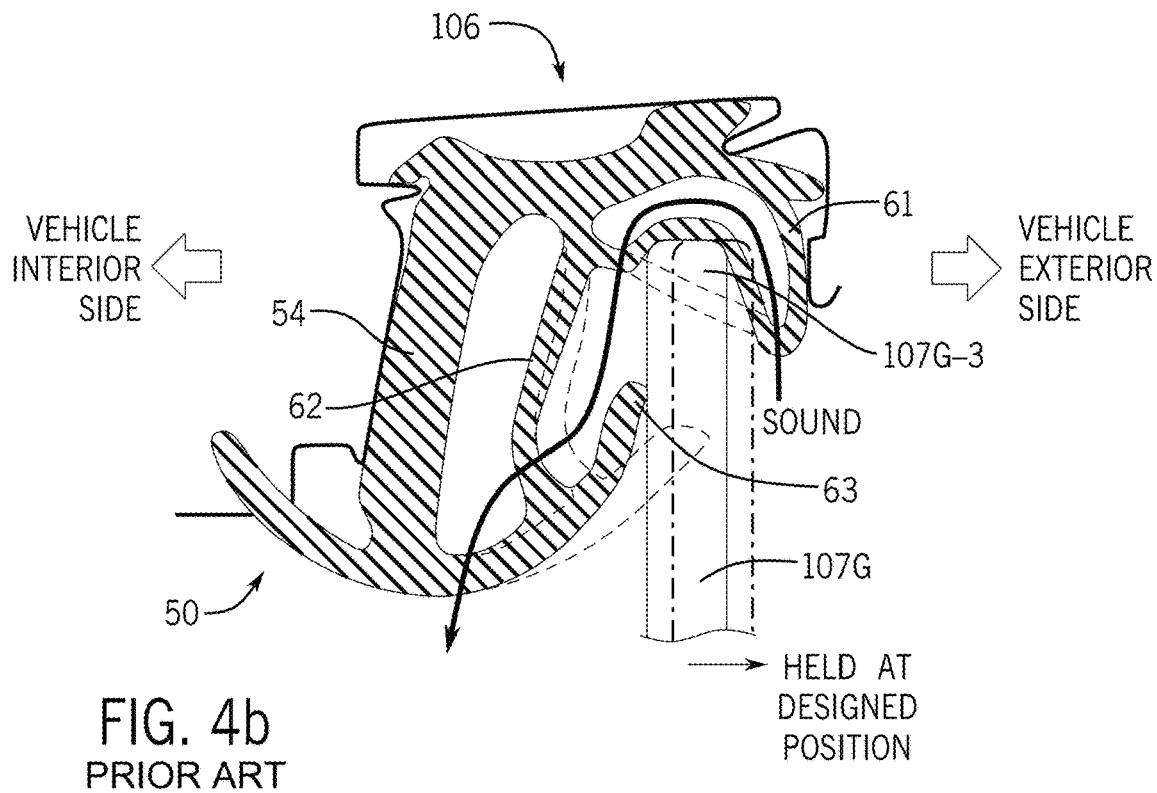

Further, as illustrated in FIG. 4b a portion of the conventional weather strip 50 at which portion the roof side is sealed is also not provided with a portion similar to the roof-side protruding section 23 which portion supports the roof-side seal lip section 63 when the door is closed. As such, attaching the conventional weather strip 50 to the hardtop 100 results in a phenomenon in which an end of the front door glass 107G on a vertically upper side intrudes toward the vehicle interior side due to deterioration of the conventional weather strip 50 with age (see a portion indicated with a solid line in FIG. 4). This not only compromises appearance of a region of the peripheral section 102 which region corresponds to the roof side 106 but also decreases sealing properties and sound insulating properties in a region where the roof-side hollow sealing section 61 comes in contact with the end 107G-3 of the front door glass 107G on the vertically upper side.

Meanwhile, the roof portion 10b of the weather strip 1 in accordance with the embodiment of the present invention is provided with the roof-side protruding section 23 (and the roof-side tip lip section 23a). Accordingly, even in a case where deterioration with age occurs, the end 107G-3 of the front door glass 107G on the vertically upper side is maintained substantially at a designed position (see a portion indicated with a dash-dot line in FIG. 4). This enables both (i) prevention of degradation in appearance in the vicinity of the peripheral section 102 and (ii) prevention of decrease in sealing properties and sound insulating properties in a region of the peripheral section 102 which region corresponds to the roof side 106, which degradation and decrease are caused by deterioration with age.

<Variations of Weather Strip>

In addition to the weather strip 1, various embodiments of the weather strip in accordance with the present invention can be assumed. This will be discussed below in detail with reference to FIG. 5a and FIG. 5b.

Figure 5A:
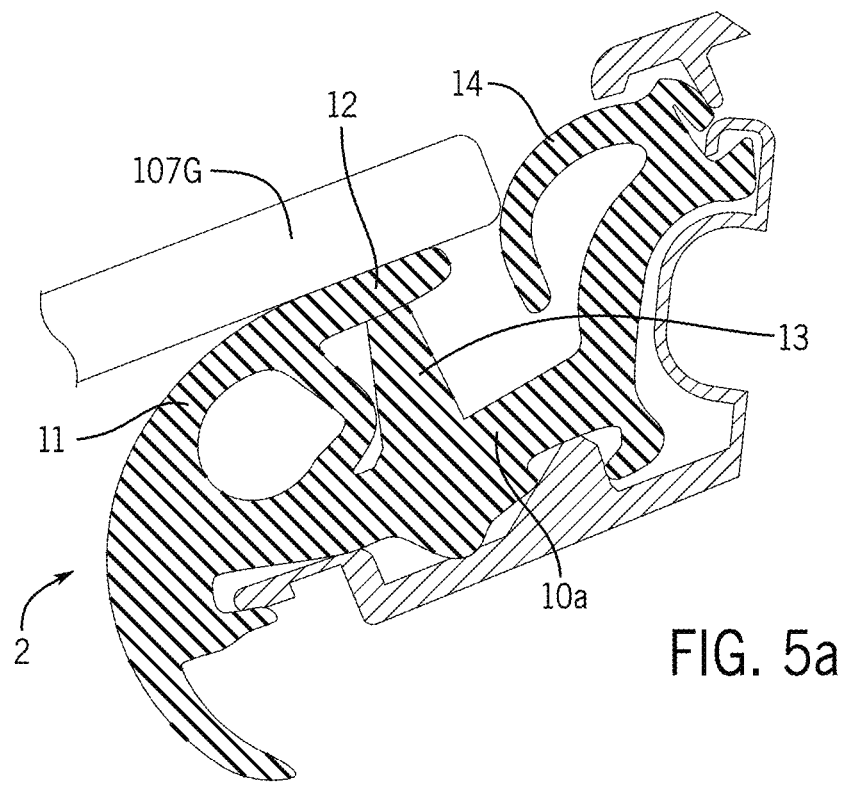
FIG. 5a and FIG. 5b are cross-sectional views each schematically illustrating an arrangement of a weather strip in accordance with another embodiment of the present invention.

First, the weather strip in accordance with the present invention includes, as an embodiment thereof, a weather strip 2 having a structure as illustrated in FIG. 5a in which no pillar-side tip lip section 13a is provided at a tip of a pillar-side protruding section 13 at a pillar portion 10a. In this case, when the door is closed, the tip of the pillar-side protruding section 13 abuts against a first seal lip section 12, so that the pillar-side protruding section 13 directly supports the first seal lip section 12.

Note that, though not illustrated in the drawings, the weather strip in accordance with the present invention may have a structure in which no roof-side tip lip section 23a is provided at a tip of a roof-side protruding section 23 at a roof portion 10b.

Figure 5B:
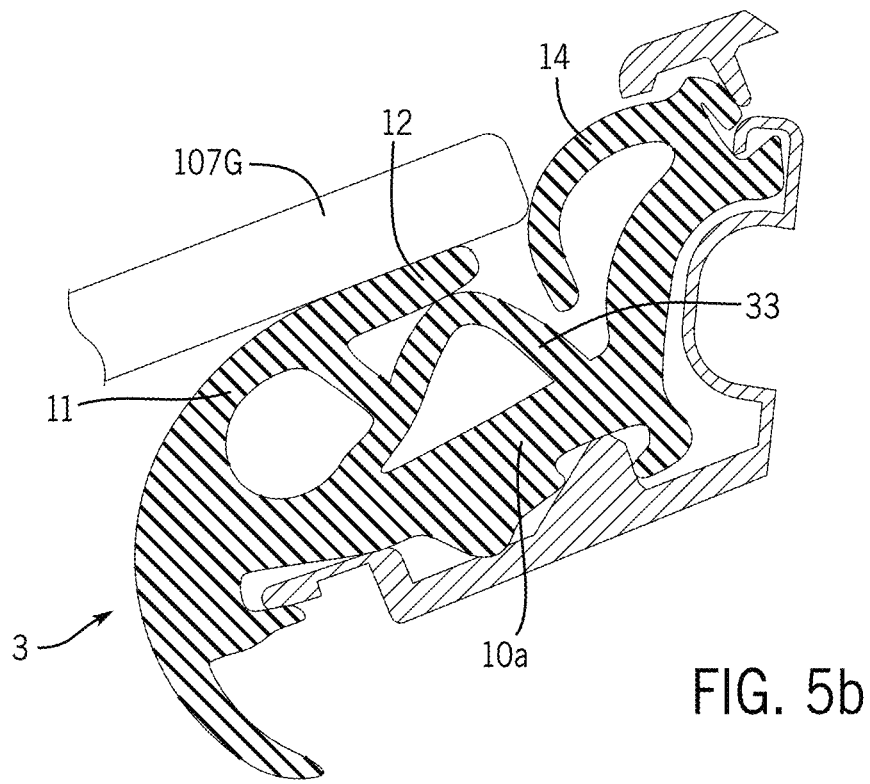

Next, the weather strip in accordance with the present invention includes, as an embodiment thereof, a weather strip 3 having a structure as illustrated in FIG. 5b in which no pillar-side tip lip section 13a is provided in the vicinity of a top of a pillar-side protruding section 33 at a pillar portion 10a and the pillar-side protruding section 33 has a hollow section. In this case, when the door is closed, the top of the pillar-side protruding section 33 abuts against a first seal lip section 12, so that the pillar-side protruding section 33 directly supports the first seal lip section 12.

The provision of the pillar-side protruding section 33 which is hollow shaped means that more portions functioning as sound insulation walls are provided as compared with the pillar-side protruding section 13 which is fin-shaped. Accordingly, sound insulating properties can be further improved by, for example, designing the pillar-side protruding section 33 to have a thick circumferential wall which constitutes the hollow section.

Note that, though not illustrated in the drawings, the weather strip in accordance with the present invention may have a structure in which no roof-side tip lip section 23a is provided in the vicinity of a top of a roof-side protruding section, which is hollow shaped, at a roof portion 10b.

CONCLUSION

In order to attain the object, a weather strip in accordance with an aspect of the present invention is a weather strip which is attached to a peripheral section of a sashless door opening of an automobile, including: a base secured along the peripheral section; and a seal lip section for sealing between the peripheral section and door glass in a door opening-closed state in which the sashless door opening has been closed by a sashless door, the base being provided with a protruding section protruding toward a vehicle exterior side in a state where the base is secured to the peripheral section, the protruding section supporting the seal lip section by abutting against the seal lip section in the door opening-closed state.

According to the arrangement above, the protruding section of the weather strip in accordance with the present invention supports the seal lip section by abutting against the seal lip section in the door opening-closed state. Accordingly, intrusion of the door glass toward the vehicle interior side in a case where the door is closed is restricted not only by reactive force generated at the seal lip section but also by support of the door glass by means of the protruding section through the seal lip section. As such, even in a case where the reactive force generated at the seal lip section decreases due to deterioration with age, the intrusion can be restricted by the support of the door glass by the protruding section. This enables prevention of degradation in appearance at the peripheral section of the door opening which degradation is caused by degradation with age.

Further, according to the arrangement above, in the door opening-closed state, the position of the door glass is maintained at a designed position not only by reactive force generated at the seal lip section but also by support of the door glass by means of the protruding section through the seal lip section. As such, even in a case where the reactive force generated at the seal lip section decreases due to deterioration with age, the door glass can be held to be at a designed position due to the support of the door glass by the protruding section. This enables prevention of decrease in sealing properties and sound insulating properties at the peripheral section of the opening in the body of the automobile which decrease is caused by a change, due to degradation with age, in position where the door glass is held.

Further, in order to attain the object, a weather strip in accordance with an aspect of the present invention is preferably arranged such that the protruding section is made of an elastic member which is more solid than the seal lip section.

According to the arrangement above, when externally applied force, the protruding section bends and/or deforms to an extent less than the seal lip section of the weather strip in accordance with the present invention. Accordingly, even in a case where the weather strip in accordance with the present invention becomes deteriorated with age, the protruding section does not bend and/or deform so significantly, as compared with the seal lip section. As such, as compared with a case in which the protruding section is molded out of an elastic member identical to that for the seal lip section, decrease in force of the protruding section to support the seal lip section, which decrease is caused by deterioration with age, is suppressed. This allows intrusion of the door glass toward the vehicle interior side to be restricted by the protruding section more reliably.

Further, in order to attain the object, a weather strip in accordance with an aspect of the present invention is preferably arranged such that the protruding section is provided, at a tip thereof, with a tip lip section which comes in elastic contact with the seal lip section in the door opening-closed state.

According to the arrangement above, the tip lip section which is bent is present between the door glass and the protruding section in the door opening-closed state. As such, for example, in a moment of closing the door, the bent tip lip section serves as a cushion for the protruding section abutting against the door glass. Furthermore, the bent tip lip section also serves as a cushion against rattling of the door glass during driving of the automobile. Accordingly, it is possible to lessen an impact generated in the vicinity of the peripheral section, for example, in a moment of closing the door.

Further, in order to attain the object, a weather strip in accordance with an aspect of the present invention is preferably arranged such that in the door opening-closed state, a tip of the seal lip section and a tip of the tip lip section both face in a direction in which the door glass advances.

According to the arrangement above, in the door opening-closed state, a tip of the seal lip section and a tip of the tip lip section both face in a direction in which the door glass advances. This makes it possible, for example, to prevent rain or the like, which has intruded toward the vehicle interior side through a gap between the door glass and the seal lip section provided at an end of the pillar portion on the rear side, from being guided by the tip lip section to the front side. This allows providing a weather strip which (i) is capable of effectively preventing the water or the like from intruding from the door opening into an interior of the automobile and (ii) has further improved sealing properties.

Further, in order to attain the object, a weather strip in accordance with an aspect of the present invention is preferably arranged such that the protruding section has a back surface abutting against a main body of a body of the automobile.

According to the arrangement above, the back surface of the protruding section abuts against the body of the automobile. This allows force applied from the door glass to the protruding section to be directly transmitted to the body. This allows reliably performing positioning of the door glass along a direction toward the outside of the body.

<Supplementary Note>

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1, 2, 3: weather strip
10a: pillar portion
10b: roof portion
12: first seal lip section (seal lip section)
13, 33: pillar-side protruding section (protruding section)
13a: pillar-side tip lip section (tip lip section)
22: roof-side seal lip section (seal lip section)
23: roof-side protruding section (protruding section)
23a: roof-side tip lip section (tip lip section)
100: hardtop (automobile)
101: door opening (sashless door opening)
102: peripheral section
103: front pillar (pillar)
104: center pillar (pillar)

106: roof side
107: front door (sashless door)
107G: front door glass (door glass)

We claim:

1. A weather strip which is attached to a center pillar of a door opening for a sashless door of an automobile, comprising:
    a base secured along the center pillar; and
    a seal lip section for sealing between the center pillar and a door glass when the door opening has been closed by the sashless door,
    the base being provided with a protruding section protruding toward a vehicle exterior side of the automobile,
    the base being provided with a pillar-side hollow lip section, wherein the pillar-side hollow lip section is closer to a front of the automobile than the protruding section,
    the seal lip section extending from a section of the pillar-side hollow lip section which is closest to the vehicle exterior side of the automobile in such a manner that the seal lip section extends toward the vehicle exterior side of the automobile,
    a distance between the section of the pillar-side hollow lip section and a point of the base in a direction from a vehicle interior side of the automobile to the vehicle exterior side of the automobile being shorter than a distance between a tip of the protruding section, which protrudes towards the vehicle exterior side, and the point of the base in the direction from the vehicle interior side to the vehicle exterior side,
    the protruding section supporting the seal lip section by abutting, from the vehicle interior side of the automobile, against a tip of the seal lip section when the door glass is in a closed state, and
    the tip of the seal lip section abutting the door glass at least when the door glass is in the closed state.

2. The weather strip as set forth in claim 1, wherein the protruding section has a higher amount of rigidity than the seal lip section.

3. The weather strip as set forth in claim 1, wherein the tip of the seal lip section and the tip of the protruding section both face in a same direction.

4. The weather strip as set forth in claim 1, wherein the protruding section has a back surface abutting against the automobile.

5. The weather strip as set forth in claim 1, wherein the protruding section includes a notch adjacent the tip of the protruding section.

* * * * *